Aug. 28, 1928.

J. KRIZ, JR 1,682,011

AUTOMATIC TAKE-UP FOR CONNECTING RODS

Filed Dec. 8, 1926

Inventor

Joseph Kriz, Jr.

By

Attorney

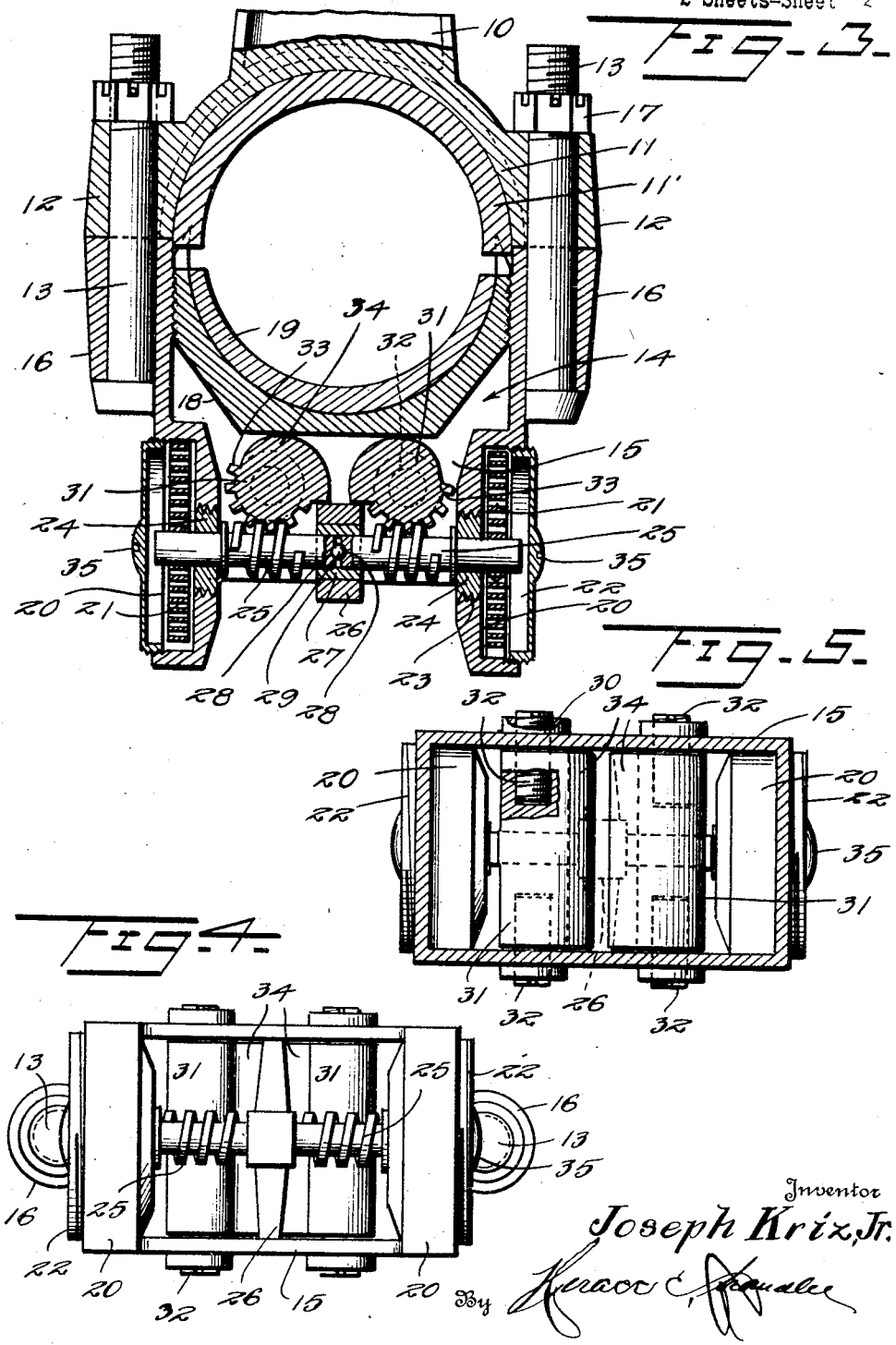

Patented Aug. 28, 1928.

1,682,011

UNITED STATES PATENT OFFICE.

JOSEPH KRIZ, JR., OF ST. PAUL, MINNESOTA.

AUTOMATIC TAKE-UP FOR CONNECTING RODS.

Application filed December 8, 1926. Serial No. 153,437.

This invention relates to new and useful improvements in connecting rods, and particularly to the bearing adjustments therefor.

One object of the invention is to provide a novel and improved form of means for automatically adjusting the lower portion of the bearing as said bearing wears.

Another object is to provide a connecting rod wherein the lower portion of the bearing thereof is removable, and contains novel means for automatically adjusting the said bearing part upwardly toward the wrist-pin.

Other objects and advantages will be apparent from the following description when taken in connection with the accompanying drawings.

In the drawings:

Figure 1 is an elevation of the lower end of a connecting rod made in accordance with the present invention, viewed from the front.

Figure 2 is a similar view looking from the side.

Figure 3 is a vertical sectional view on the line 3—3 of Figure 2.

Figure 4 is a bottom plan view of the same.

Figure 5 is a horizontal sectional view on the line 5—5 of Figure 1.

Referring particularly to the accompanying drawings, 10 represents a portion of the stem of a connecting rod, having the bearing section 11 thereon, said section having the bolt receiving lugs, shown on opposite sides thereof at 12, in which are disposed the clamping bolts 13.

The lower bearing section, represented as a whole by the numeral 14, comprises a frame 15 having the vertical bolt receiving lugs 16, alining with the lugs 12, and receiving said bolts 13 therethrough, whereby, when the nuts 17, which are engaged on the bolts, are tightened, the bearing parts will be tightly clamped together, in embracing relation to the wrist-pin (not shown). Within the upper portion of the said lower section 14 is a bronze backing 18, supporting the Babbitt lining 19 in cooperative relation with the upper bearing lining 11'. On each side of the member 14, below the bronze member 18, is a casing 20 within which is disposed a motor spring 21. The outer wall 22 of the casing is removable, as shown, to permit access to the interior of the casing. In the inner wall of each casing 20 is formed a threaded opening 23, in which is screwed the bushing 24, for supporting the adjacent end of the worm shaft 25. One end of the said spring 21 is secured to this shaft 25, while its other end is secured to the casing wall. Extending transversely of the lower portion of the member 14, and at right angles to the shaft 25, is a brace arm 26, in the center of which is formed the bearing eye 27, said eye receiving the inner ends of the two worm shafts 25. The inner end face of each of the shafts 25 is formed with a concave recess 28, and disposed within the bearing eye 27, and partly received in each of the recesses 28, is a bearing ball 29, whereby the two shafts are capable of independent rotation, within the bearing eye, and antifrictionally, with respect to each other.

In the front and rear walls of the lower portion of the member 14 there are formed the alined pairs of openings 30. Extending between each pair of openings 30 is a shaft 31, and threaded in each end of each of said shafts is a screw or bolt 32, the outer portion of which is adapted to rotate in the said opening 30, whereby to properly support the shafts. Each of the shafts is formed with screw gear teeth 33 meshing with the worm thread of a shaft 25. Also formed on each of the shafts 31, and extending the entire length of a shaft, to provide the maximum bearing surface, is a cam 34, said cam bearing against the lower face of the bronze member 18, to urge the same upwardly, as the shaft 31 is rotated, in one direction.

It will be understood that the tendency of the springs 21 is to rotate the shafts 25, which in turn rotate the shafts 31, whereby to cause the cams 34, of the latter shafts, to press upwardly against the backing member 18, to urge the Babbitt element 19 against a wrist-pin. As the bearing elements wear away, the springs 21 rotate the cam shafts, whereby to move the bearing upwardly, and thereby maintain close contact between the bearing and the wrist-pin. Thus there will not occur any loose play between the connecting rod bearing, and the wrist-pin.

The center of the outer face of each removable wall 22 is formed with a transversely grooved boss 35, for reception of a screwdriver, whereby to remove the wall.

What is claimed is:

1. In an automatic adjusting means for bearings, an upper bearing part, and a lower bearing part, a bearing element supported in the lower part, worm shafts supported in the lower part, screw shafts engaged there-with, cams on the screw shafts engaged with the bearing element, and spring means for urging the worm shafts rotatably.

2. A lower bearing part for a pitman comprising a casing, casings in opposite sides of the first casing, motor springs in the casings, a support between the spring casings, worm shafts supported in the support and in the spring casings and connected with said springs, screw shafts supported in the main casing and meshing with the worm shafts, a Babbitt support, and cams on the screw shafts engaged with said Babbitt support.

3. A bearing comprising two parts clamped together, one of the parts including a stationary section and a movable section, an extension on the stationary section having a casing and a bearing, a gear shaft supported in said bearing and extending into said casing. a shaft on the stationary section meshing with and driven by the gear shaft, a cam on the driven shaft engaged with the movable section, and a motor spring in said casing and connected with the casing and the gear shaft for rotating the cam shaft to urge the movable section toward the other bearing part.

4. In an automatic adjusting means for bearings, an upper bearing part, and a lower bearing part, a bearing element supported in the lower part, worm shafts supported in the lower part, screw shafts engaged with the worm shafts, cams on the screw shafts engaged with the bearing element, and normally wound motor springs operatively connected with the worm shafts and said lower part for urging the worm shafts rotatably to move the bearing element.

In testimony whereof, I affix my signature.

JOSEPH KRIZ, Jr.